Aug. 18, 1942.    R. C. COX    2,293,491
TUBULAR RIVET
Filed May 31, 1941
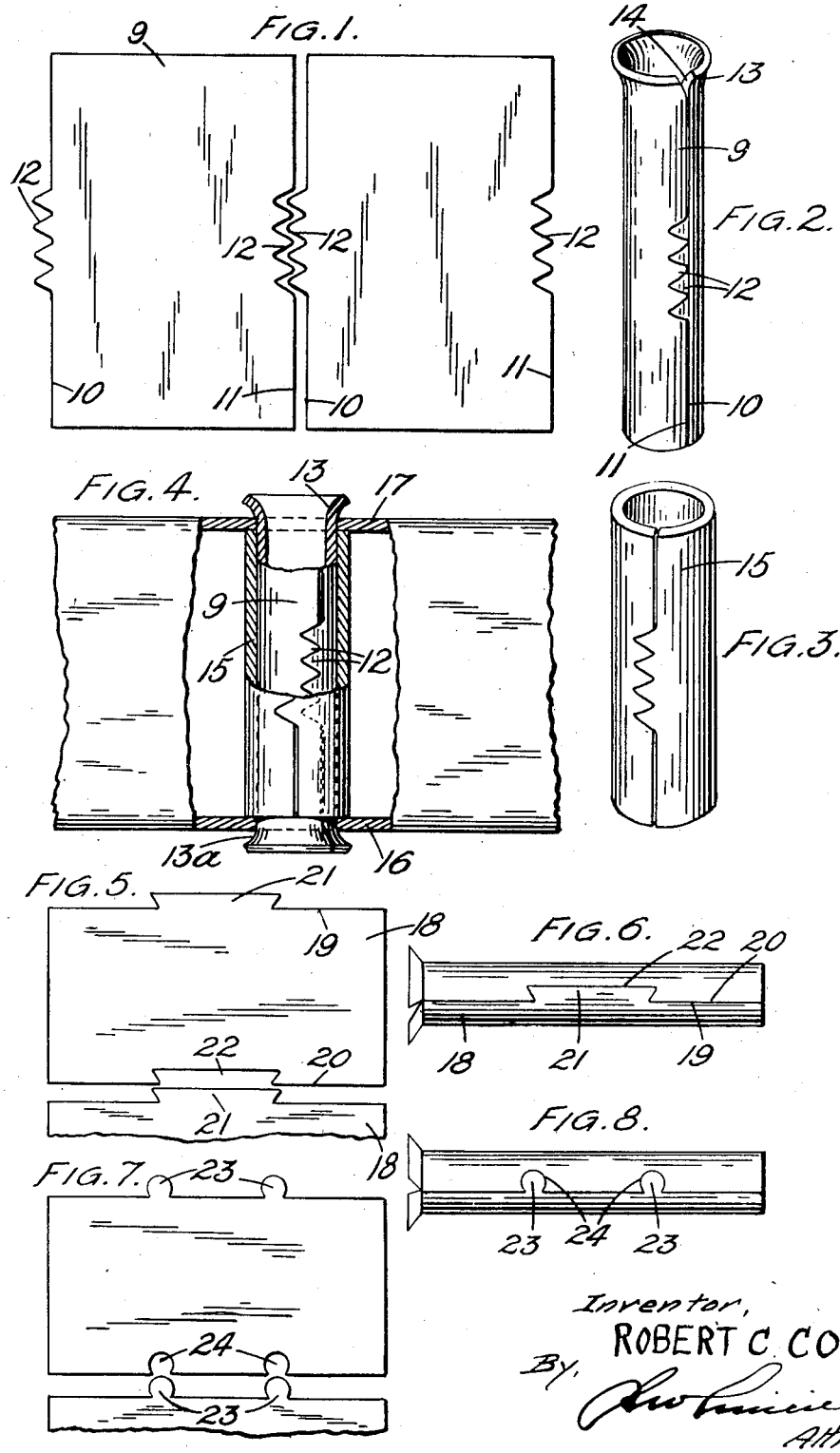
Inventor,
ROBERT C. COX Patented Aug. 18, 1942

2,293,491

UNITED STATES PATENT OFFICE 2,293,491

TUBULAR RIVET

Robert Charles Cox, Otley, England

Application May 31, 1941, Serial No. 396,150
In Great Britain December 11, 1939

2 Claims. (Cl. 85—40)

This invention relates to tubular rivets.

Tubular rivets have almost invariably been produced by a tube-drawing operation.

At the present time the production of tubular rivets is of paramount importance to the aircraft industry, and difficulty frequently occurs in obtaining drawn tubular rivets, with the result that aircraft production may be held up on that account alone.

The present invention consists in a split tubular rivet having the edges which define the split formed with portions which interengage to inhibit relative displacement of the said edges.

Generally speaking, the split can quite satisfactorily extend longitudinally in a sense which is generally parallel to the axis of the rivet, but in some cases the split may extend somewhat spirally in relation to the axis of the rivet. It is to be understood, however, that where we use the term "split tubular rivet" in the present specification and claims it is intended to imply that the split runs from one end of the rivet to the other; while, furthermore, a rivet is distinguished from a plain length of tubular material by reason of the fact that one end is provided with a head. The head may be constituted by a flared or rolled end which can be produced in the operation of forming the tubular rivet.

For all practical purposes, it may be regarded that the split tubular rivet according to the invention is produced by a rolling or similar operation which preferably employs starting blanks pressed out from sheet material.

The co-operating parts which define the split may have curved or serrated portions merely co-operating in the tubular form of the rivet to secure the contiguous edges against relative longitudinal movement, or they may interfit to prevent also separation of the edges in a sense laterally of the split and thereby to prevent it opening.

In another aspect the invention may be stated as a method of producing split tubular rivets, which consists in forming blanks from sheet material with an opposed pair of edges having complementary irregular formation, and causing the blanks to assume split tubular form in which the opposed complementary edges engage.

The invention further consists in the employment in a riveted structure of rivets constructed in accordance with the present invention, which is characterised by the fact that the rivet is engaged through two spaced surfaces having coaxial apertures, one in each of the surfaces and fitting the shank of the rivet, the surfaces being spaced by a tubular distance piece which receives the rivet. Such an arrangement ensures that when the rivet is in situ with the heading operation completed the heads serve both to locate the rivet and to grip the surfaces each between its adjacent head and the distance piece end.

Rivets produced in accordance with the present invention have certain advantages over the more general drawn tubular rivets; for instance drawn tubular rivets tend to harden with the drawing process and are prone therefore subsequently to split and to render it difficult for the head to be expanded satisfactorily. Likewise, with an ordinary drawn tubular rivet the expansion of the head involves quite considerable stretching of the material, whereas in the case of split tubular rivets in accordance with the present invention the flaring or expansion of the end can be accommodated to a very large extent merely by opening the split, with the result that the actual sheet material is not placed under any substantial tension.

It will be realised that blanks cut out with interfitting parts formed in the edges which are intended to become contiguous on completion of a rolling or like operation are characterised by the fact that in defining the projecting members of the eventually co-operating parts along one edge, the recessed members are also produced, so that when the blanks are separated each blank has one of the eventually co-operating edges and projections already formed for complete co-operation and interengagement with the opposed edge and co-operating recesses.

In order that it may be clearly understood and more readily carried into effect, the invention is hereinafter described with reference to the accompanying diagrammatic drawing, of which—

Figure 1 is a plan view indicating two blanks from each of which a tubular member can be formed according to the present invention;

Figure 2 is a perspective view indicating a tubular rivet produced simply by rolling one of the blanks and flaring one of the ends;

Figure 3 is a perspective view indicating a distance piece used in a riveting operation, the nature and purpose of which distance piece will become apparent from the ensuing description;

Figure 4 is an elevation partly in section indicating the application of a rivet as shown in Figure 2 and a distance piece in accordance with Figure 3;

Figure 5 illustrates an alternative form of blank showing also the co-operating edge of an adjacent blank;

Figure 6 is a side elevation of a rivet produced from the complete blank shown in Figure 5; whereas Figures 7 and 8 are views corresponding to Figures 5 and 6 but showing respectively alternative forms of blank and rivet.

Referring first to Figure 1, it will be seen that the blanks are cut out preferably from strip material. Each blank 9 is cut out in generally rectangular form, the overall dimensions being chosen in accordance with the size of the tubular rivet ultimately required. It is intended that the tubular rivet shall be produced simply by rolling or otherwise bringing one of the blanks into the required tubular form, and in the present case it may be regarded that in the intended tubular form the edges 10 and 11 are complementary, and those edges are therefore formed with serrated portions 12. It will be realised that by stamping the blanks out the serrated portions 12 are exactly complementary, and when the edges 10 and 11 come together in the tubular form the serrations 12 interengage and serve to prevent longitudinal displacement of the then substantially contiguous edges 10 and 11.

The finished form of rivet shown in Figure 2 serves to indicate how the serrated portions 12 have engaged. Figure 2 also shows a flaring 13 produced at one end of the rivet so that when inserted in the structure only the remaining end requires flaring in order to secure the rivet. The flared end 13 can be produced actually in the rolling operation, or it may be formed by a suitable expanding tool when the rivet has been brought into its tubular form; and it will be observed that in producing the flaring all that has occurred is that the split has opened, as indicated at 14, with the result that there is no substantial stretching of the material.

The distance piece 15 shown in Figure 3 is in this case intended to fit over the rivet shown in Figure 2 and is formed in the same way as the rivet, except that generally speaking there will be no necessity to flare the end.

In Figure 4 it may be regarded that the two members which are to be riveted together are the opposed walls 16 and 17. The nature and function of the distance piece 15 now becomes apparent, for it will be seen that it serves to space the walls 16 and 17. For insertion of the rivet, the walls 16 and 17 are drilled appropriately and the rivet 9 is inserted. If the flared portion 13 is preformed, as it preferably will be, the rivet is pushed home through the distance piece and through the opposed wall 16, and finally secured in position by flaring the other end, as indicated at 13a, by means of a suitable tool.

It will be realised that where the distance piece is provided there is very little possibility, even under quite considerable strain, of the serrations separating, and as they cannot displace longitudinally the rivet is quite secure and will retain its form under any ordinary stresses likely to be imposed upon it. It also follows that the necessity for having the distance piece also of split form may to some extent depend upon whether or not there is available a source of supply of tube of the requisite dimensions. If such source of supply is available it can be utilised, but generally speaking it is believed that both rivets and distance pieces can be produced more cheaply in split tubular form from blanks in the manner described above.

In Figure 5 there is shown a blank 18 the complementary edges 19 and 20 of which have respectively a dovetailed projection 21 and a dovetailed recess 22 stamped out from them. When the edges 19 and 20 are brought together in the rolled form the projection 21 fits into the recess 22 and prevents not only longitudinal displacement of the then mating edges 19 and 20, but also positively prevents their separation in a lateral sense. It is realised that bringing the projection 21 into engagement with the recess 22 to form the tubular rivet shown in Figure 6, it will be necessary to snap the projection 21 into the recess by radial pressure at the completion of the rolling operation owing to the fact that the projection will not be able to enter the recess 22 through the gap in the wall 20.

The arrangement shown in Figure 5 may be subject to considerable variation, and although a single projection and co-operating recess have been shown, there may be several co-operating projections and recesses. In fact, the arrangement described with reference to Figures 5 and 6 is shown in Figures 7 and 8 in which projections 23 are of nearly complete circular form, being pressed out from the co-operating recesses 24.

It is found in practice that it is harder to give the serrations or interfitting members, such as 12; 21 and 22; 23 and 24, the required circular form than it is to form the rivet itself, which difficulty no doubt arises due to the shortness of the serrations or interfitting portions. To overcome the difficulty of getting the required formation for the serrations or interfitting portions, it is desirable in many cases that the operation of stamping out those portions shall impart to them the curvature ultimately required.

Though generally speaking in mass production it will be preferred to cut the blanks from strip material, it will be apparent that in a large number of cases it may be possible to utilise scrap pieces of sheet material for the production of the blanks.

As an alternative to a rolling operation for producing the split tubular rivets, it is proposed that the sheet or strip material may be slit to the tolerance required by means of rotary slitting machines; the strip is then passed through cropping tools having means to produce the required number of serrations or interfitting portions, whereafter the blanks are raised into U form on raising tools. The U forms are then folded into tubular form by means of a closing tool and sized mandrel; and, finally, the head may be produced by means of a retaining tool and conical punch, or alternatively, by spinning in a lathe.

Where the operation is as immediately above described, or where the rivets are produced by a rolling operation, the blanks may be annealed by the approved heat treatment preparatory to the raising or rolling.

I claim:

1. A split tubular rivet having the meeting edges defining the split formed to interlock against relative longitudinal movement under strain on the rivet following its application, one end of the rivet being initially upset by flaring through spreading the rivet on the line of split to avoid any material stretching of the material of the rivet.

2. A split tubular rivet having the meeting edges defining the split formed to interlock against relative longitudinal and lateral movement under strain on the rivet following its application, one end of the rivet being initially upset by flaring through spreading the rivet on the line of split to avoid any material stretching of the material of the rivet.

ROBERT CHARLES COX.